(12) United States Patent
Sato et al.

(10) Patent No.: US 6,357,471 B1
(45) Date of Patent: Mar. 19, 2002

(54) VALVE INSERTION METHOD AND CUTTING TOOL

(75) Inventors: Toshiyuki Sato; Tamotsu Yamashita, both of Takatsuki (JP)

(73) Assignee: Suiken Technology Co., Ltd., Shiga (JP)

( * ) Notice: Subject to any disclaimer, the term of this patent is extended or adjusted under 35 U.S.C. 154(b) by 0 days.

(21) Appl. No.: 09/460,971

(22) Filed: Dec. 15, 1999

(51) Int. Cl.[7] .................. F16K 43/00; B23B 51/00; B23B 51/08
(52) U.S. Cl. ................. 137/318; 408/199; 408/223; 408/224; 408/713
(58) Field of Search ................. 137/318; 408/186, 408/199, 223, 224, 230, 713

(56) References Cited

U.S. PATENT DOCUMENTS

| | | | |
|---|---|---|---|
| 4,303,358 A | * 12/1981 | Grusa | 408/223 |
| 4,516,598 A | 5/1985 | Stupak | 137/318 |
| 4,563,113 A | * 1/1986 | Ebenhoch | 408/223 |
| 4,648,760 A | * 3/1987 | Karlsson et al. | 408/223 |
| 4,927,303 A | * 5/1990 | Tsujimura et al. | 408/223 |
| 5,611,365 A | 3/1997 | Maichel | 137/318 |
| 5,622,461 A | * 4/1997 | Tukala et al. | 408/224 |
| 5,732,728 A | 3/1998 | Maichel | 137/318 |
| 5,816,753 A | * 10/1998 | Hall | 408/224 |
| 5,820,318 A | * 10/1998 | Danielsson et al. | 408/224 |

FOREIGN PATENT DOCUMENTS

| | | |
|---|---|---|
| JP | 49-59368 | 8/1974 |
| JP | 52150892 | 12/1977 |
| JP | 09103908 | 4/1997 |
| JP | 11201299 A | 7/1999 |

* cited by examiner

Primary Examiner—George L. Walton
(74) Attorney, Agent, or Firm—Sughrue Mion, PLLC

(57) ABSTRACT

A valve insertion method without stopping passage of fluid, wherein, first, a part of an already-installed pipe is enclosed air-tightly with a valve casing, a milling type cutting tool which has cutting edges on a free end surface and an outer circumferential surface thereof, and a gate being housed in the valve casing with the gate and the cutting tool fixed thereto. The gate and cutting tool are provided in positions spaced from each other in the axial direction of the already-installed pipe. A worker then feeds the cutting tool in the radial direction of the already-installed pipe as he has the cutting tool make cutting motions for cutting the pipe by the rotation of the cutting tool. The valve casing is then turned in the circumferential direction of the already-installed pipe as the cutting motions are kept made, whereby a cut groove cut in the direction of the range of the whole circumference of the pipe is formed. After the grooving operation is finished, the worker takes out the cutting tool from the valve casing, and then closes an operation valve. After the grooving operation is finished, the worker transfers the valve casing in the axial direction of the already-installed pipe, whereby the gate is transferred to a position which corresponds to that of the cut groove.

6 Claims, 16 Drawing Sheets

VALVE INSERTION METHOD AND CUTTING TOOL

BACKGROUND OF THE INVENTION

1. Field of the Invention

This invention relates to a valve insertion method without stopping passage of fluid, and a cutting tool.

2. Description of the Prior Art

A valve insertion method comprising drilling a hole in an already-installed pipe (or existing pipe) in a non-water-flow-stopping state, and inserting a valve in the hole thus cut in the already-installed pipe in a line including the same pipe has heretofore been known.

FIGS. 15(a) and 15(b) shows an outline of a conventional valve insertion method disclosed in U.S. Pat. No. 4,516,598.

According to the conventional techniques shown in these drawings, an already-installed pipe 1 is enclosed with a sealing case 800. The sealing case 800 houses a hole saw 802 and a gate 804 therein in advance. A circular opening is then drilled in the already-installed pipe 1 with the hole saw 802. After the opening is drilled, the sealing case 800 is turned as shown by arrows 850 in FIG. 15 (a), and the gate 804 is thereafter inserted into the circular opening 803 shown in FIG. 15(b).

The conventional techniques of FIGS. 15(a), (b) enable the insertion of the valve after the completion of the pipe cut-off operation to be carried out speedily. However, in the conventional techniques of FIGS. 15(a), (b), the dimensions of the sealing case 800 increase because it is necessary that the hole saw 802 having the dimensions of which are equal to those of the gate 804 to be inserted is housed in the sealing case 800.

FIG. 16 shows an outline of a conventional valve insertion method disclosed in U.S. Pat. No. 5,611,365 and International Patent Laid-Open WO97/31207.

In the method shown in this drawing, an already-installed pipe 1 is enclosed with a sealing case 600 first. A gate 601 is then turned with the sealing case 600 to cut-off the already-installed pipe 1 with a cutting tool 602 fixed to a free end of the gate 601. According to the conventional method described above, the dimensions of the sealing case 600 decrease because the cutting tool 602 has small dimensions. However, since the cutting tool 602 is fixed to the gate 601, the leakage of water is not perfectly prevented. The already-installed pipe 1 is cut-off with a tip type cutting tool 602. Therefore, in order to cut into an already-installed pipe 1 comprising a cast iron pipe or a steel pipe, the sealing case 600 has to be turned many times, so that it takes much time to cut-off the pipe.

U.S. Pat. No. 5,732,728 discloses a valve insertion method using an assembly provided with a rotary valve casing, a cutting assembly and a gate assembly. According to the conventional techniques, the gate assembly is fixed in place of the cutting assembly after a grooving operation is carried out, so that the dimensions of an apparatus decrease. However, in this prior art method, it is necessary to carry out an operation for replacing the cutting assembly with the gate assembly by opening and closing a seal means, so that the operations take much time.

SUMMARY OF THE INVENTION

Therefore, a primary object of the present invention is to provide a valve insertion method capable of carrying out valve insertion work speedily and miniaturizing a sealing case.

Another object of the present invention is to provide a cutting tool capable of improving a discharge rate of cutting chips producing in an operation for cutting an already-installed pipe (or existing pipe) in the valve insertion method.

One Aspect

In one aspect of embodiment of the valve insertion method according to the present invention, a valve assembly is inserted in an already-installed line by using a milling type cutting tool, the valve assembly and an operation valve so as to achieve these objects.

A worker prepares in advance the cutting tool, the valve assembly and the operation valve.

The cutting tool is supported so that it can be rotated freely around an axis set in an axial direction of the already-installed pipe, and it has cutting edges on its free end surface and outer circumferential surface.

The valve assembly has a valve casing forming a flow passage, a gate housed in the valve casing, and a valve spindle adapted to slide the gate in a direction which crosses the fluid passage at substantially right angles thereto.

The valve casing is provided with a first and second divisional cases separated from each other in the circumferential direction of the already-installed pipe.

Either one of these divisional cases is provided with a tool entering hole opened toward the center of the already-installed pipe.

The second divisional case is provided with a gate housing hole adapted to house the gate therein when the valve is opened, and enable the gate to move slidingly.

The gate housing hole and tool entering hole are provided in positions spaced from each other in the axial direction of the pipe.

The operation valve is fixed to the valve casing so that it can open and close the tool entering hole.

This valve insertion method has an assembling step, a drilling step, a grooving step, a tool takeout step and a transfer step which will be described below.

In the assembling step, a part of the already-installed pipe is enclosed air-tightly with the valve casing, and the gate and the cutting tool, which is independent of the gate, are housed in the valve casing with the gate and the cutting tool fixed thereto.

In the drilling step, the cutting tool is fed in the radial direction of the already-installed pipe as it is made to take cutting motions. The "cutting motions" referred to above means motions for cutting the already-installed pipe with the cutting tool rotated around the set axis mentioned above.

In the grooving step, the valve casing is turned in the circumferential direction of the already-installed pipe with the cutting motions kept being made. Owing to the turning of the valve casing in this step, the cutting tool is turned in the circumferential direction of the already-installed pipe, whereby the cutting tool is made to take feeding motions. Consequently, the already-installed pipe is cut in the whole of a circumferentially extending portion thereof with the cutting tool without producing a cut-off section. Thus, a cut groove is formed (cut) in the portion of the already-installed pipe, and extends in the direction of the range of the whole circumference thereof.

In the tool takeout step, the cutting tool is taken out from the valve casing via the operation valve after the completion of the grooving operation. Thereafter the operation valve is closed.

In the transfer step, the valve casing is transferred in the axial direction of the already-installed pipe after the completion of the grooving operation, whereby the gate is transferred to a position corresponding to that of the cut groove.

Another Aspect

In another aspect of embodiment of the valve insertion method according to the present invention, a valve assembly is inserted in an already-installed line by using a milling type cutting tool, a valve assembly and an operation valve.

A worker prepares in advance the cutting tool, the valve assembly and the operation valve.

The cutting tool is supported so that it can be rotated freely around an axis set in an axial direction of the already-installed pipe, and it has cutting edges on its free end surface and outer circumferential surface.

The valve assembly has a valve casing forming a flow passage, a gate housed in the valve casing, and a valve spindle adapted to slide the gate in a direction which crosses the fluid passage at substantially right angles thereto.

The valve casing is provided with a first and second divisional cases separated from each other in the circumferential direction of the already-installed pipe.

The second divisional case is provided with a gate housing hole, and a tool entering hole.

The gate housing hole is adapted to house the gate therein when the gate is opened, and is opened in the flow passage to enable the gate to move slidingly.

The tool entering hole is opened toward the center of the already-installed pipe diagonally with respect to the gate housing hole.

The width of an opening, which is on the side of a free end of the gate, of the gate housing hole is set larger than the outer diameter of the cutting tool.

The operation valve is fixed to the valve casing so that it can open and close the tool entering hole.

This valve insertion method has an assembling step, a drilling step, a grooving step and a tool takeout step.

In the assembling step, a part of the already-installed pipe is enclosed air-tightly with the valve casing, and the gate and the cutting tool, which is independent of the gate, are housed in the valve casing with the gate and the cutting tool fixed thereto.

In the drilling step, the cutting tool is fed in the radial direction of the already-installed pipe by passing the cutting tool diagonally through a part of the gate housing hole as the cutting tool is made to take cutting motions. The "cutting motions" referred to above means motions for cutting the already-installed pipe with the cutting tool rotated around the set axis mentioned above.

In the grooving step, the valve casing is turned in the circumferential direction of the already-installed pipe with the cutting motions kept being made. Owing to the turning of the valve casing in this step, the cutting tool is turned in the circumferential direction of the already-installed pipe, whereby the cutting tool is made to take feeding motions. Consequently, the already-installed pipe is cut in the whole of a circumferentially extending portion thereof with the cutting tool without producing a cut-off section. Thus, a cut groove is formed (cut) in the portion of the already-installed pipe, and extends in the direction of the range of the whole circumference thereof.

In the tool takeout step, the cutting tool is taken out from the valve casing via the operation valve after the completion of the grooving operation. Thereafter the operation valve is closed.

In the method according to the present invention, the already-installed pipe can be cut with the cutting tool rotated independently of the valve casing, so that even a cast iron pipe or a steel pipe can be cut in a short period of time.

Since the gate is housed in the valve casing in advance, an upper working tank is not required. Moreover, since the groove is cut with a small cutting tool, the dimensions of the operation valve decrease. Accordingly, the dimensions of the valve assembly as a whole decrease.

Since the gate and cutting tool are housed in the valve casing in advance, it is unnecessary to carry out an operation for replacing the cutting tool by the gate, so that the term of work decreases greatly.

The "already-installed pipe" in the present invention means a pipe in which a fluid, such as water flows, and such a pipe is mostly buried in the ground.

The "air-tightly enclosing" means sealing to such an extent that does not hinder the grooving (drilling and feeding) operation and the valve insertion operation carried out thereafter. For example, a method of discharging with water the cutting chips, which are produced during the grooving operation, from a water discharge hole provided in the valve casing and opened during the grooving operation may be employed.

The "cutting tool" used in this valve insertion method is a milling type tool having a plurality of cutting edges in each of the free end surface and outer circumferential surface thereof, so that it does not include a bite and a cutter wheel.

In order to cut an already-installed pipe having mortar lining on an inner surface thereof, a cutting tool provided with a plurality of tips made of a hard metal, or a cutting tool having the cutting edges of diamond particles are preferably used.

The "cutting" referred to in the specification of the present invention means cutting a part of a pipe wall by rotating the cutting edges. The "feed motion" means causing the cutting tool to move to positions in which different parts of the pipe wall can be cut one after another with the cutting tool.

The "inserting a valve assembly into an already-installed line" referred to in the specification of the present invention does not mean the physical insertion of a gate into a cut-off portion of an already-installed pipe but it means setting in an already-installed line (conduit) a valve assembly for preventing the leakage of water from and regulating a flow rate in the same line.

The "valve assembly" above means an apparatus as a whole which includes a gate, a valve casing and a valve spindle.

The "gate" means a member for closing a flow passage. The "valve casing" means a member housing the gate irrespective of the opened or closed condition of the gate.

The cutting tool used in the present invention is suitable for cutting an already-installed pipe in a non-fluid-flow-stopping condition. This cutting tool is provided with a substantially cylindrical cutter body, a plurality of first tips, a plurality of second tips, and a plurality of recesses formed in the cutter body.

The cutter body has a base end surface, a free end surface and an outer circumferential surface.

The first tips project forward from the free end surface of the cutter body.

The second tips project outward from the outer circumferential surface of the cutter body.

The recesses extend to a substantially central portion of the free end surface, and have a fan shape in a free end view of the tool body.

The cutter body has a plurality of divisional surfaces defining each of the recesses.

These divisional surfaces are arranged in the radial direction of the cylindrical body.

One of these divisional surfaces is provided thereon with not less than one first tip and not less than one second tip.

Since the cutting tool is formed in this manner, the recesses constitute discharge flow passages for discharging the cutting chips producing during the grooving operation using the first and second tips.

When an already-installed pipe is cut by rotating this cutting tool, a fluid in this pipe flows from the free end surface of the cutter body along the discharge flow passages, and is discharged from a discharge hole, whereby the cutting chips are discharged with the fluid. Accordingly, the entry of the cutting chips producing during the grooving operation into the same pipe can be restrained.

BRIEF DESCRIPTION OF THE DRAWINGS

The present invention will be understood more clearly from the following descriptions of the preferred embodiments included in the specification with reference to the accompanying drawings. The embodiments and drawings are prepared for illustrating and describing the invention. The scope of the present invention is defined on the basis of the claims. The same part numbers in a plurality of drawings among the accompanying drawings represent identical or equivalent parts.

DESCRIPTION OF THE PREFERRED EMBODIMENTS

The embodiments of the present invention will now be described with reference to the drawings.
First Embodiment
FIGS. 1–7 show a first embodiment.
Valve Assembly 10

Figure 1:
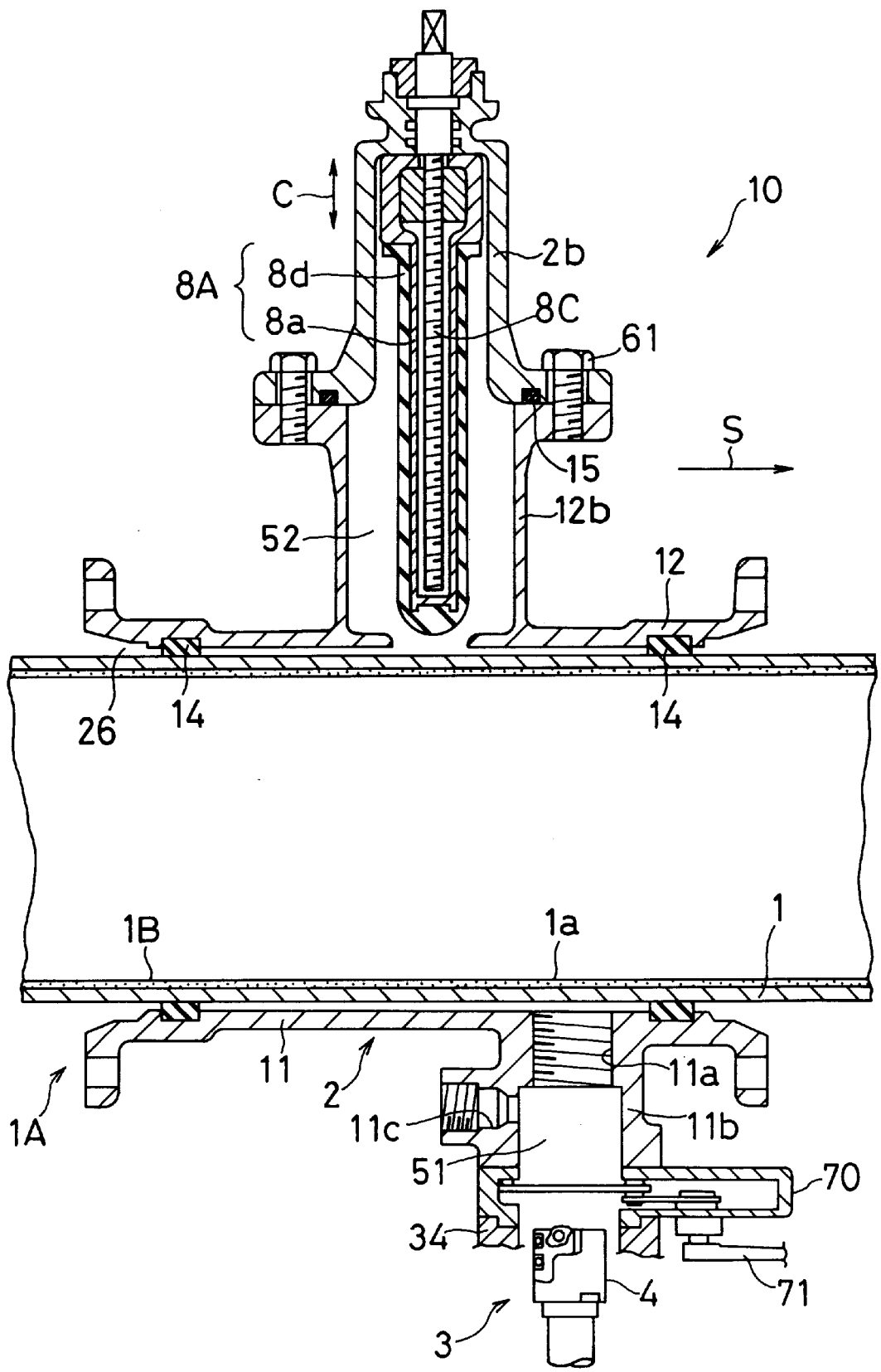
FIG. 1 is a longitudinal sectional view showing a valve assembly mounted fixedly on an object pipe in a first embodiment of the valve insertion method according to the present invention.
Figure 2:
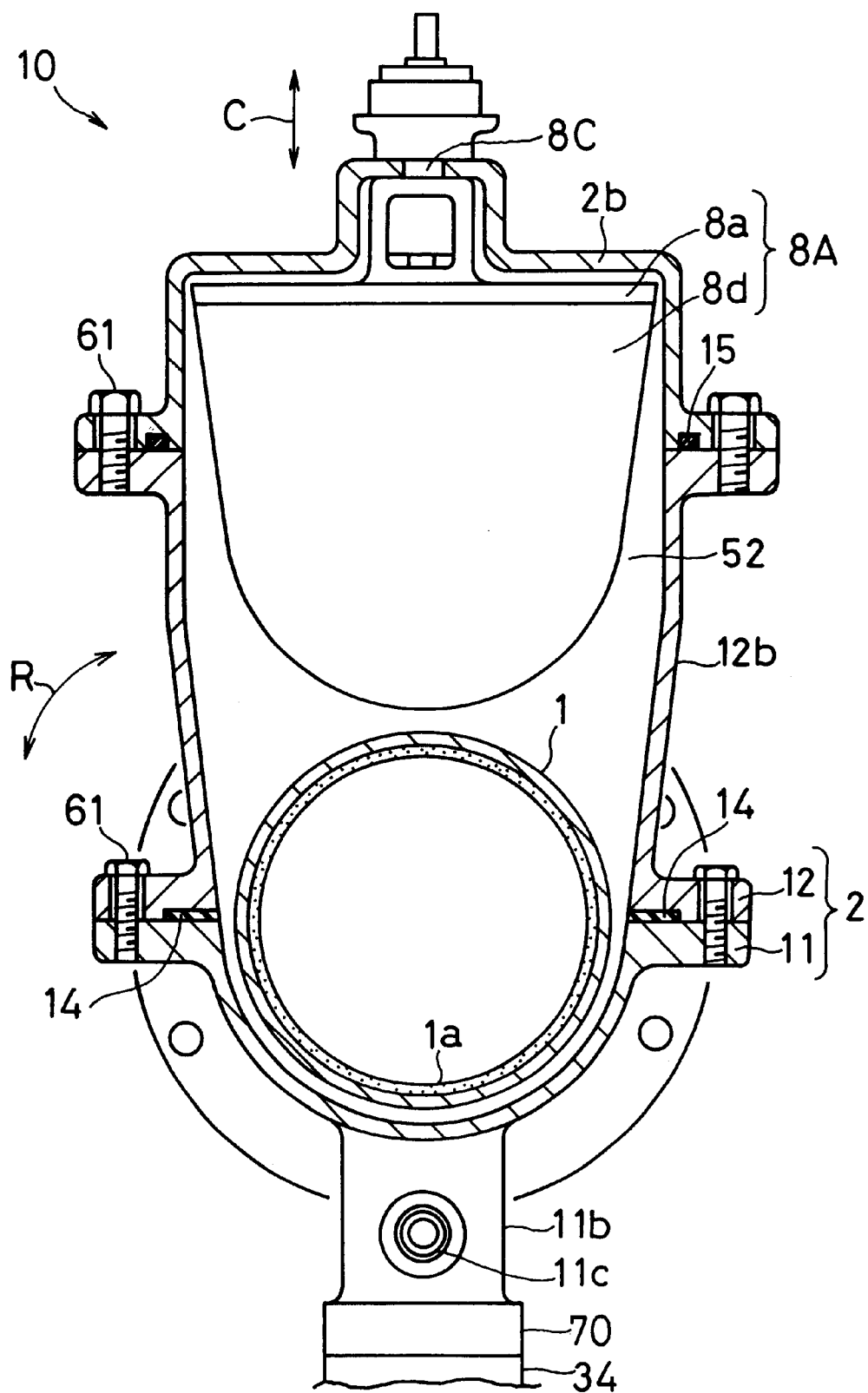
FIG. 2 is a horizontal sectional view of what is shown in FIG. 1.

As shown in FIGS. 1 and 2, a valve assembly 10 has a valve casing 2, a gate 8A and a valve spindle 8C. The valve casing 2 forms a flow passage 1B after a valve insertion work is completed, and is provided with first and second divisional cases 11, 12 separated in the circumferential direction R of an already-installed pipe 1, and a valve bonnet 2b. The valve bonnet 2b is fixed to the second divisional case 12 by assembling bolts 61. The gate 8A is housed in advance in the valve casing 2. The valve spindle 8C is adapted to slide the gate 8A in a direction C which crosses the flow passage 1B at right angles thereto.

A clearance between the valve casing 2 and already-installed pipe 1 and that between the first and second divisional cases 11, 12 shown in FIG. 2 are sealed with rubber packings 14. A clearance between the valve bonnet 2b and second divisional case 12 is sealed with a rubber ring 15. The valve casing 2 is provided at both end portions thereof with packing insert portions 26 in which rubber rings (not shown) are forcibly inserted.

The first divisional case 11 is provided with a first branch portion 11b integral therewith. The first branch portion 11b projects in a forking state from the first divisional case 11 in the radially outward direction C of the already-installed pipe 1. The first branch portion 11b forms a tool entering hole 51 opened into the center of the already-installed pipe 1, and a milling type cutting tool 4 is passed through the first branch portion 11b. An attachment 34 of a cutting apparatus 3 is fixed to the first branch portion 11b via an operation gate valve (operation valve) 70. The operation gate valve 70 is fixed to the first branch portion 11b so that the former can open and close the tool entering hole 51. A clearance between the first branch portion 11b and operation gate valve 70 and that between the operation gate valve 70 and attachment 34 are sealed with rubber rings (not shown). The first branch portion 11b has on the inner side thereof a female screw portion 11a for screwing a plug 60 of FIG. 6 thereinto. The first branch portion 11b is provided with a discharge hole 11c for discharging cutting chips, which are produced during a grooving operation, with water therefrom. A discharge valve and a hose are joined as necessary to the discharge hole 11c.

The second divisional case 12 is provided with a second branch portion 12b projecting in a forking state in the radially outward direction C of the already-installed pipe 1. The valve bonnet 2b is fixed to the second branch portion 12b. The second branch portion 12b and valve bonnet 2b house a gate 8A in the gate-opened condition, and form a gate housing hole 52 for allowing the gate 8A to move slidingly therein.

The gate housing hole 52 and tool entering hole 51 are provided in positions spaced from each other with respect to the axial direction S of the already-installed pipe 1.
Gate 8A The construction of the gate 8A inserted into a line (conduit) 1A will now be described. When the valve spindle 8C is rotated to positive and negative direction, the gate 8A is moved slidingly in the gate housing hole 52 in the radial direction C of the already-installed pipe 1. The gate 8A is provided with a gate body 8a shown in FIG. 1. A water stopping rubber packing 8d is fixed to the gate body 8a.

Figure 7:
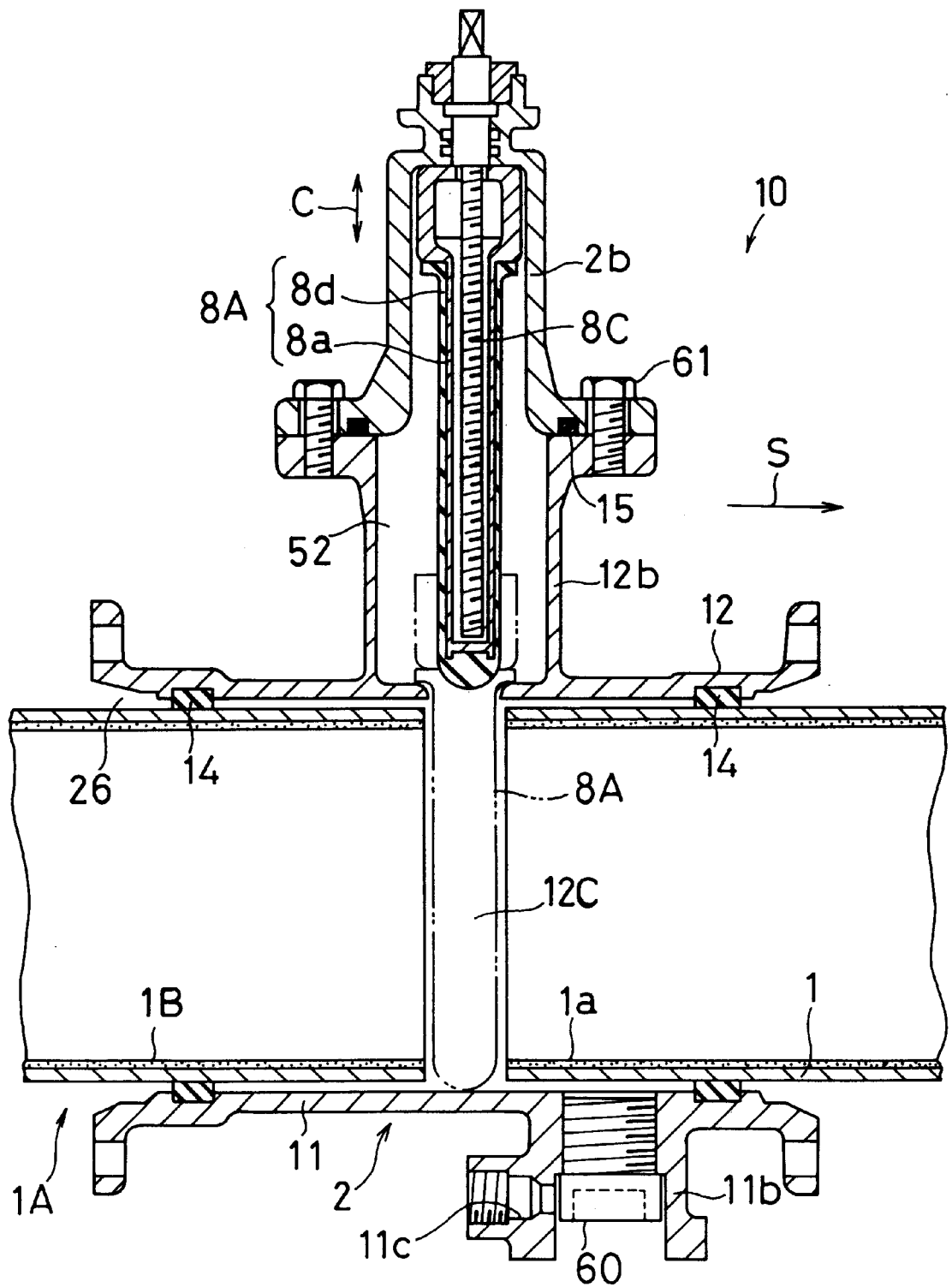
FIG. 7 is a longitudinal sectional view showing the condition of the embodiment with the valve assembly already inserted and the gate opened.

When the gate body 8a descends through a cut groove 12C, which is cut with the cutting tool 4, to a lower end thereof, the rubber packing 8d pressure contacts an inner circumferential surface of the valve casing 2 as shown by a two-dot chain line in FIG. 7, to prevent the leakage of water from the line 1A.

Cutting Apparatus 3

Figure 3:
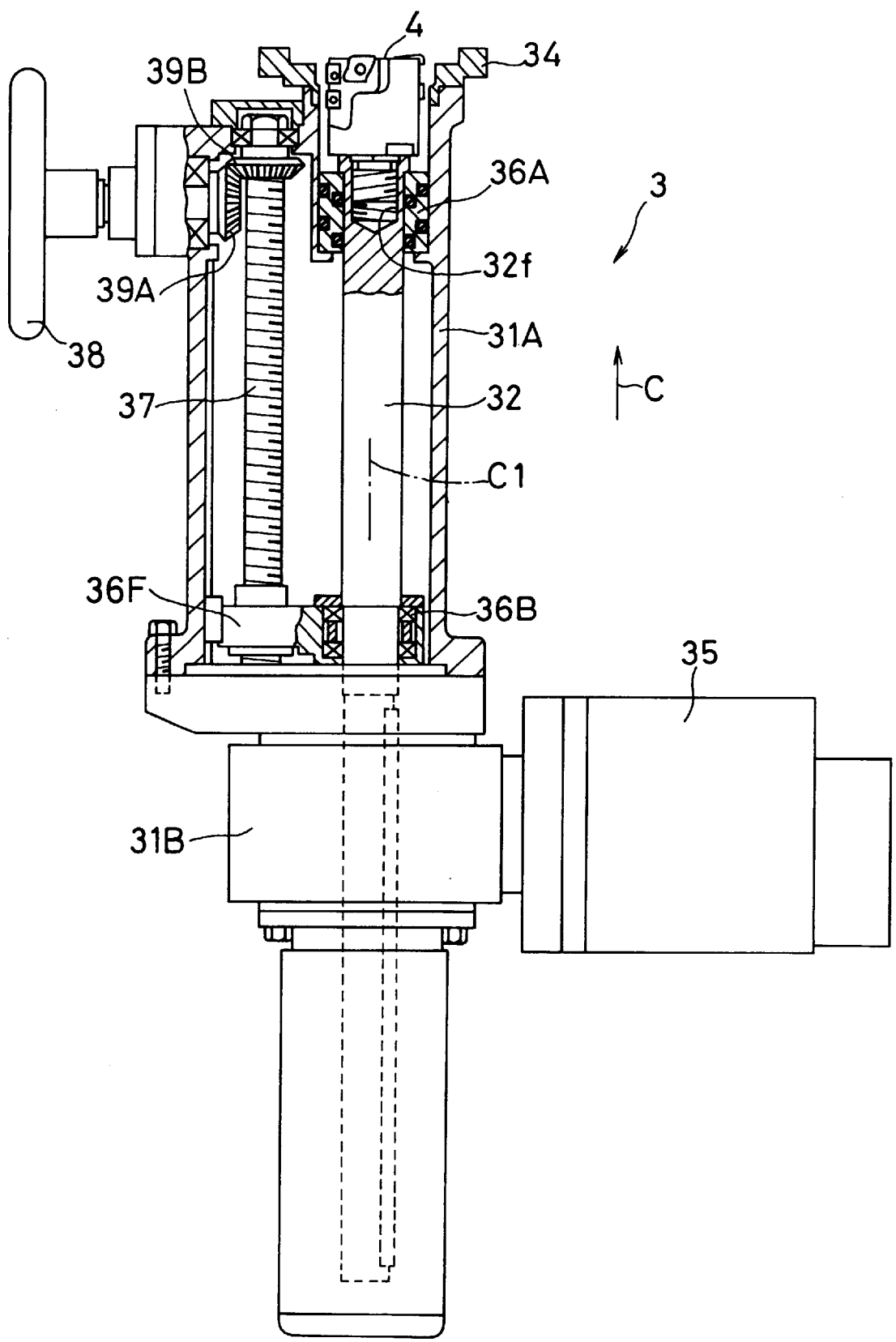
FIG. 3 is a partially sectioned side view showing a cutting apparatus.
Figure 4:
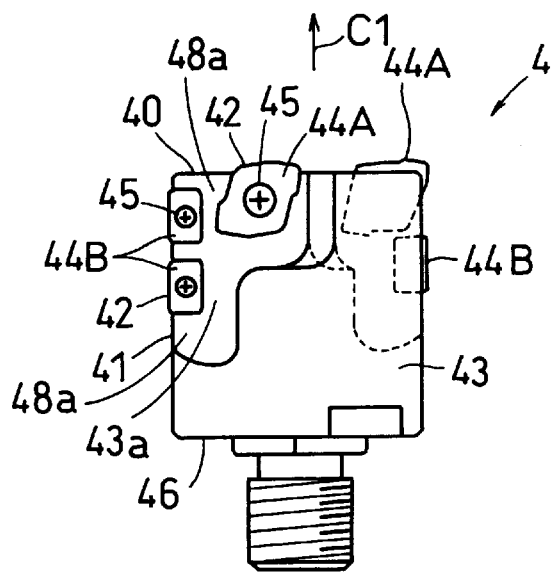
FIG. 4(a) is a side view showing a cutting tool.
FIGS. 4(b) and 4(c) are perspective views thereof.

The cutting apparatus 3 of FIG. 3 has a cutter case 31A fixed to the operation gate valve 70 (FIG. 1) via the attachment 34. An elongated cutter shaft 32 is inserted through the interior of the cutter case 31A and that of a gear case 31B. The cutter shaft 32 is supported in an inner side of the cutter case 31A and gear case 31B via a first bearing 36A and a bearing (not shown) so that the cutter shaft 32 can be rotated freely around an axis C1 set in the radial direction C of the already-installed pipe 1. The cutter shaft 32 is rotated by the power of an electric motor (an example of prime mover) 35 via a speed reducer (not shown) and a bevel gear (not shown)

The cutter case 31A is provided therein with a cutting screw 37 in parallel with the cutter shaft 32. When a handle 38 is turned, the cutting screw 37 is rotated to positive and negative direction via bevel gears 39A, 39B. A female screw formed in a grip member 36F is screwed with the cutting screw 37. The grip member 36F holds the cutter shaft 32 via a second bearing 36B. Accordingly, when the handle 38 is turned, the cutting screw 37 is rotated to cause the grip member 36F to move forward or backward, so that the cutter shaft 32 moves forward or backward.

The cutter shaft 32 is provided at a free end portion thereof with a female thread 32f for fixing the cutting tool 4 thereto.

Cutting Tool 4

The cutting tool 4 will now be described by using FIGS. 4(a), (b) and (c).

The cutting tool 4 has a substantially cylindrical tool body (cutter body) 43 adapted to be fixed by being screwed into the female thread 32f (FIG. 3). The tool body 43 has a base end surface 46, a free end surface 40 and an outer circumferential surface 41. The tool body 43 is provided with two first tips 44A, three second tips 44B and two recesses 43a.

The first tips 44A project forward (or toward the direction C1) from the free end surface 40 of the tool body 43 and form cutting edges 42 on the free end surface 40 thereof, these cutting edges 42 are adapted to cut into the already-installed pipe 1. The second tips 44B project outward from the outer circumferential surface 41 of the tool body 43 and form cutting edges 42 on the outer circumferential surface 41 thereof, these cutting edges 42 are adapted to cut the already-installed pipe 1.

The recesses 43a extend to a substantially central portion of the free end surface 40, and have a fan shape when they are viewed from the side of the free end of the tool body 43. The recess 43a are formed so that the cross-sectional areas thereof become generally smaller from the free end surface 40 toward the base end surface 46. The tool body 43 has a plurality of divisional surfaces 48a, 48b, 48c, 48d defining the recesses 43a. The divisional surfaces 48a–48d are formed so as to extend along the radial direction of the cutting tool 4. Out of the divisional surfaces 48a–48d, the first and second divisional surfaces 48a, 48b extend in the same diametrical direction.

As shown in FIG. 4(b), one first tip 44A and two second tips 44B are fixed to the first divisional surface 48a by male screws 45. As shown in FIG. 4(c), one each of the first and second tips 44A, 44B is fixed to the second divisional surface 42b by male screws 45 respectively. Since the first and second tips 44A, 44B are thus fixed, they can be replaced when the cutting edges 42 are worn out. Each of the tips 44A, 44B is made preferably of a hard metal.

Owing to such construction of the cutting tool 4, the recesses 43a form discharge flow passages for discharging cutting chips producing during a grooving operation carried out by the first and second tips 44A, 44B.

Assembling Step

The procedure for the insertion method of the gate 8A will now be described.

First, the worker prepares the cutting apparatus 3, the valve assembly 10 and the operation gate valve 70. The worker then fixes the valve casing 2 to a portion to be cut of the already-installed pipe 1 of FIG. 2 with a fluid (water) practically flowing therein, and assembles two divisional cases 11, 12 together by assembling bolts 61. The worker then fixes the cutting apparatus 3 of FIG. 3 to the first branch portion 11b, and fixes the valve bonnet 2b, to which the gate 8A and the valve spindle 8C are fixed, to the second branch portion 12b by assembling bolts 61. Thus, as shown in FIG. 1, the gate 8A and cutting tool 4 are fixed to and housed in the valve casing 2, and the valve casing 2 air-tightly encloses the mentioned part of the already-installed pipe 1.

Drilling Step

When the worker then drives the electric motor 35 of the cutting apparatus 3, the electric motor 35 rotates the cutting tool 4 with the cutter shaft 32 to have the cutting tool 4 make cutting motions for cutting the already-installed pipe 1 in accordance with the rotation thereof. When the worker feeds the cutting tool 4 in the radial direction C of the pipe 1 by operating the cutting apparatus 3 with the cutting motions made by the cutting tool 4, the free end surface 40 of the cutting tool 4 advances to a position in which the free end surface 40 thrusts into a part of a wall 1a of the already-installed pipe 1. Thus, the cutting of the cutting tool 4 into the wall 1a of the already-installed pipe 1 is completed.

Grooving Step

Figure 5:
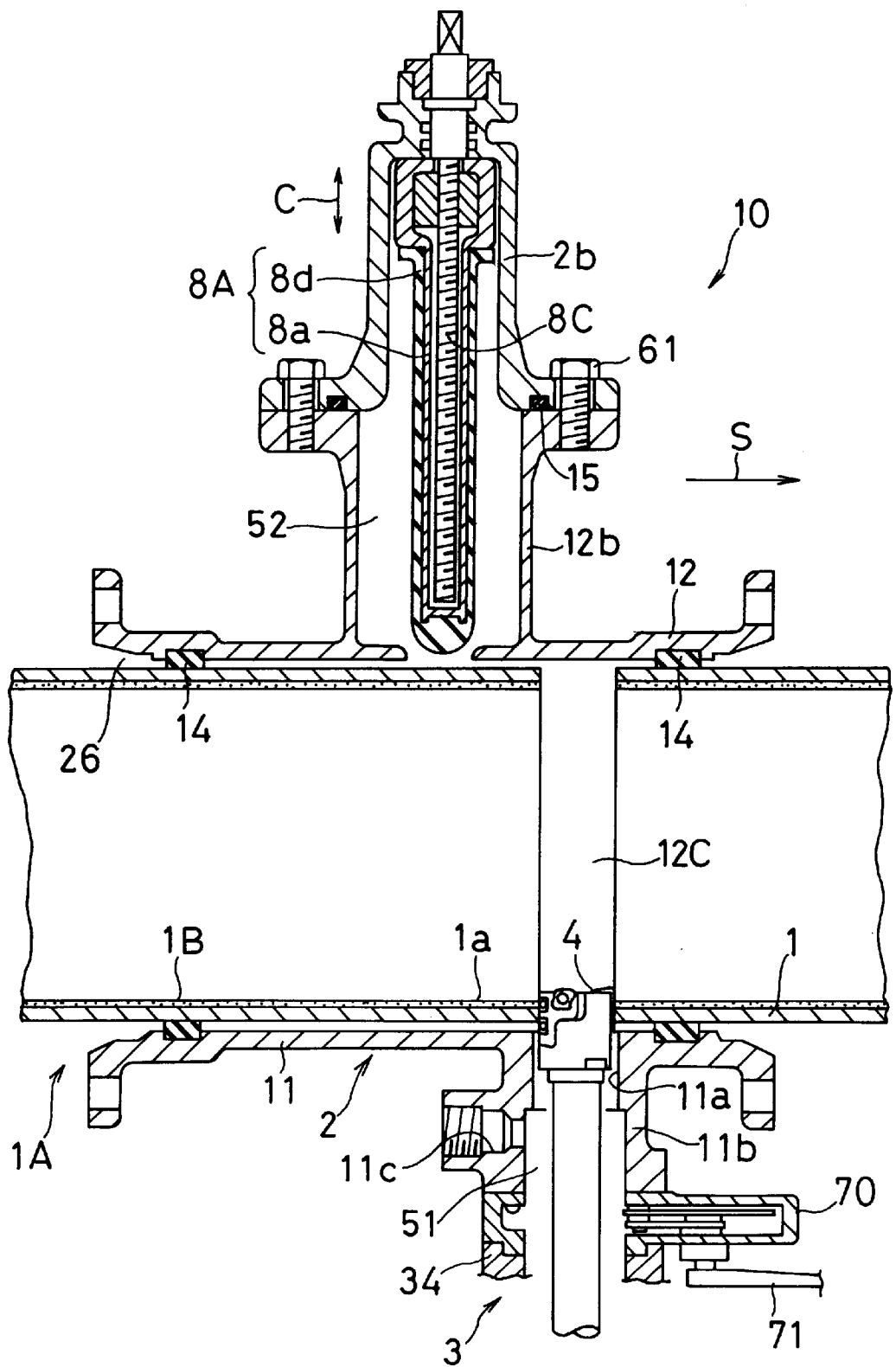
FIG. 5 is a longitudinal sectional view showing the condition of the embodiment with the grooving operation already completed.

After the cutting tool 4 cuts into the wall 1a of the already-installed pipe 1, the worker turns the valve casing 2 in the circumferential direction R of the pipe 1 of FIG. 2 with the cutting tool 4 making the cutting motions. Namely, the cutting tool 4 makes feeding motions, in which the cutting tool 4 with the valve casing 2 turns in the circumferential direction R of the already-installed pipe 1, as the cutting tool 4 rotates around the set axis C1. Thus, the worker turns the cutting tool 4, which is making feeding motions, around the whole circumference of the already-installed pipe 1. Thus, the already-installed pipe 1 is cut annularly as shown in FIG. 5 without producing a cut-off section, to form a cut groove 12C opened and extending in the whole circumference of the circumferential direction R of the pipe 1. The cut groove 12C forms a space in which the gate 8A slidingly moves.

In the drilling step and grooving step, cutting chips produces. The cutting chips are discharged with water to the outside of the valve casing 2 through the recesses 43a of FIG. 4, the tool entering hole 51, the discharge hole 11c and a hose (not shown). Accordingly, not so many cutting chips enter the interior of the already-installed pipe 1.

Tool Takeout Step

The cutting apparatus 3 is then removed by a method described below.

Figure 6:
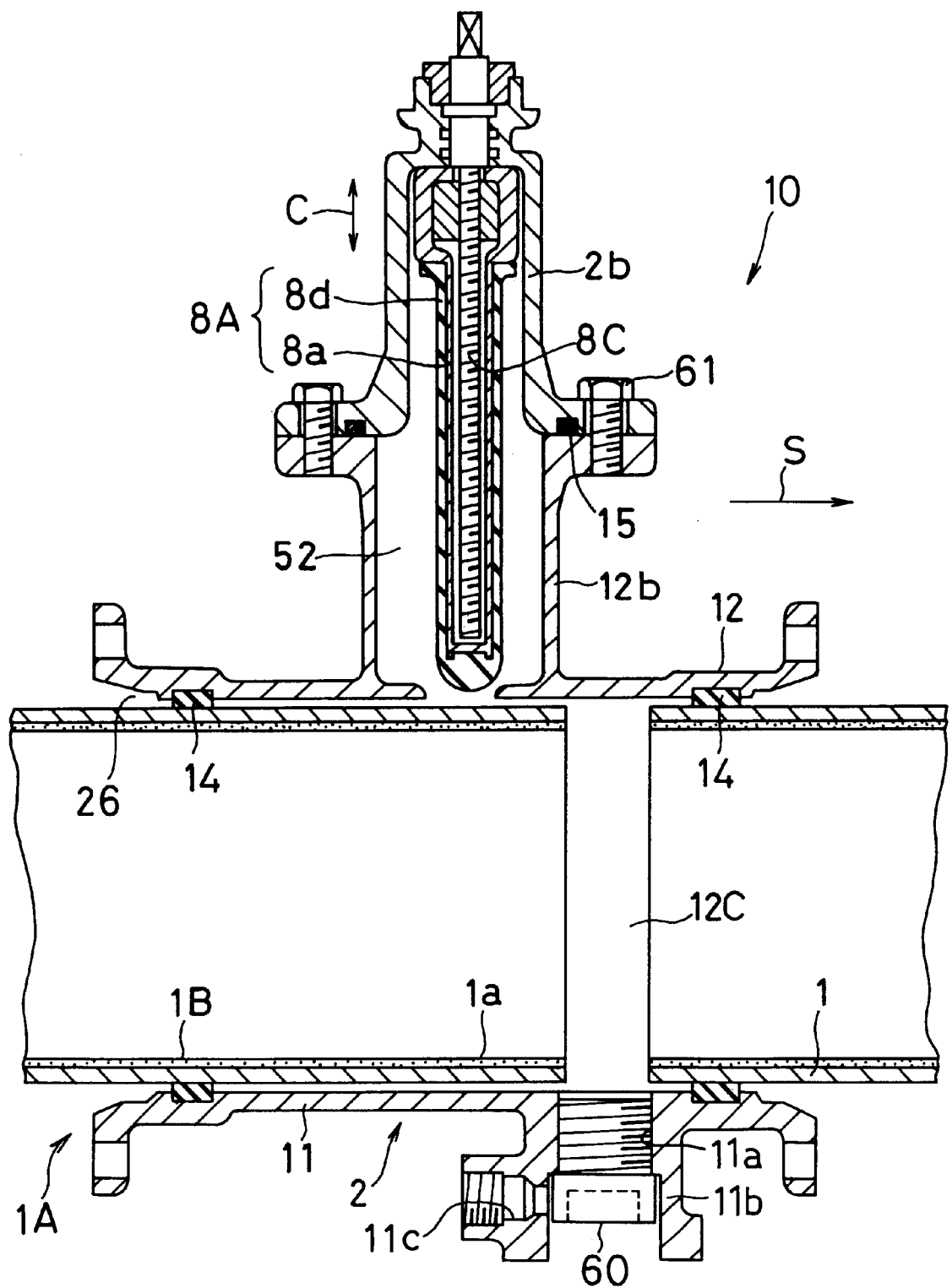
FIG. 6 is a longitudinal sectional view showing the condition of the embodiment with the tool already removed.

After the cut groove 12C is formed, the worker houses the cutting tool 4 in the cutter case 31A (FIG. 3), and then closes the operation gate valve 70 by operating the working lever 71 therefor. The worker then removes the cutting apparatus 3. After the cutting apparatus 3 is removed, the plug 60 of FIG. 6 is screwed into the female screw portion 11a of the first branch portion 11b by operating a known plug insertion means (not shown). After the plug 60 is screwed into the female screw portion 11a, the worker removes the operation gate valve 70 and plug insertion means.

Transfer Step

After the tool takeout step is carried out, the worker transfers the valve casing 2 in the axial direction S of the already-installed pipe 1 to set the position of the gate 8A corresponding to that of the cut groove 12C as shown in FIG. 7. Thus, the valve insertion work is completed to obtain a pipe structure of FIG. 7.

Second Embodiment

FIGS. 8–14 show a second embodiment.

Valve Assembly 10

Figure 8:
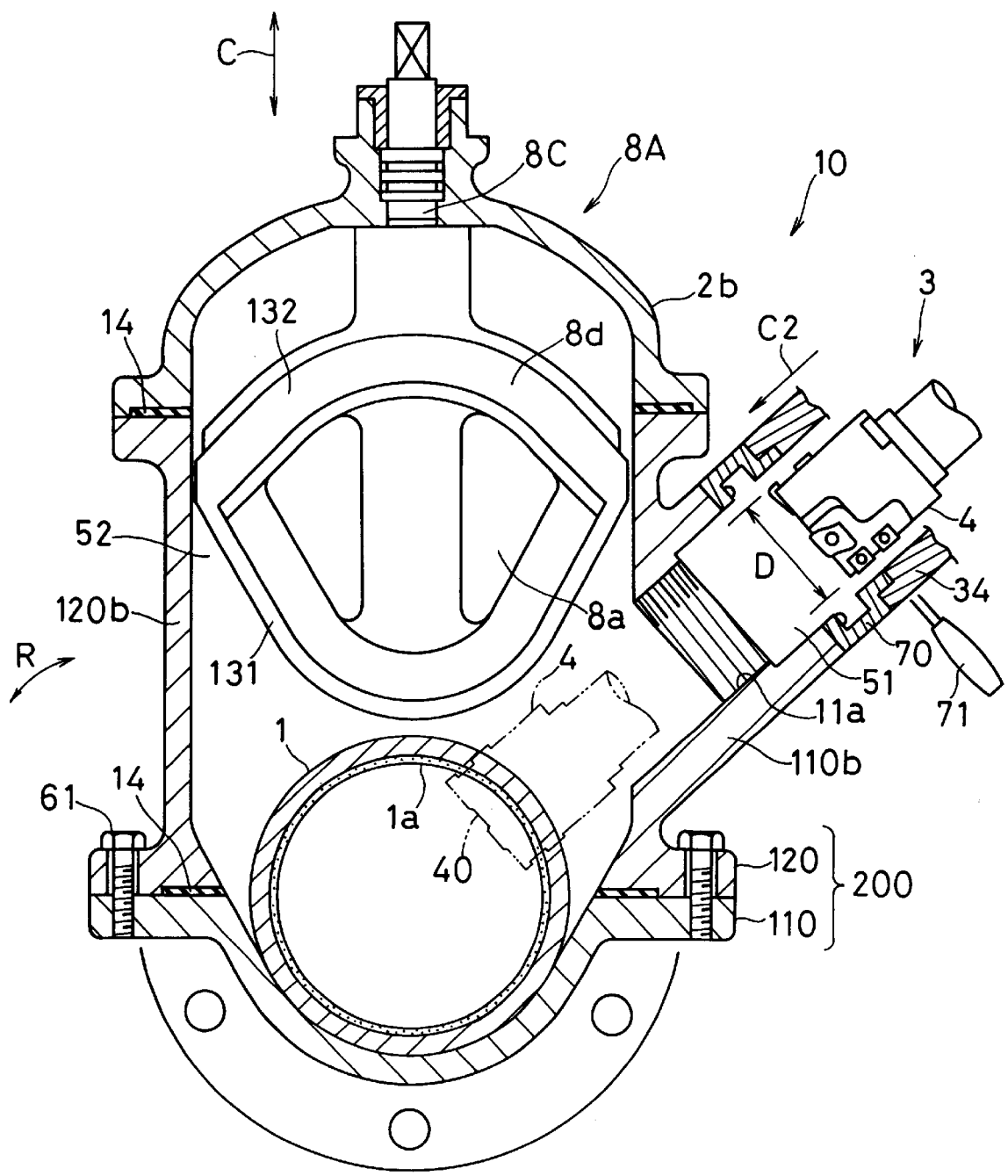
FIG. 8 is a horizontal sectional view showing a second embodiment of the valve insertion method in which a grooving operation is not yet carried out.
Figure 9:
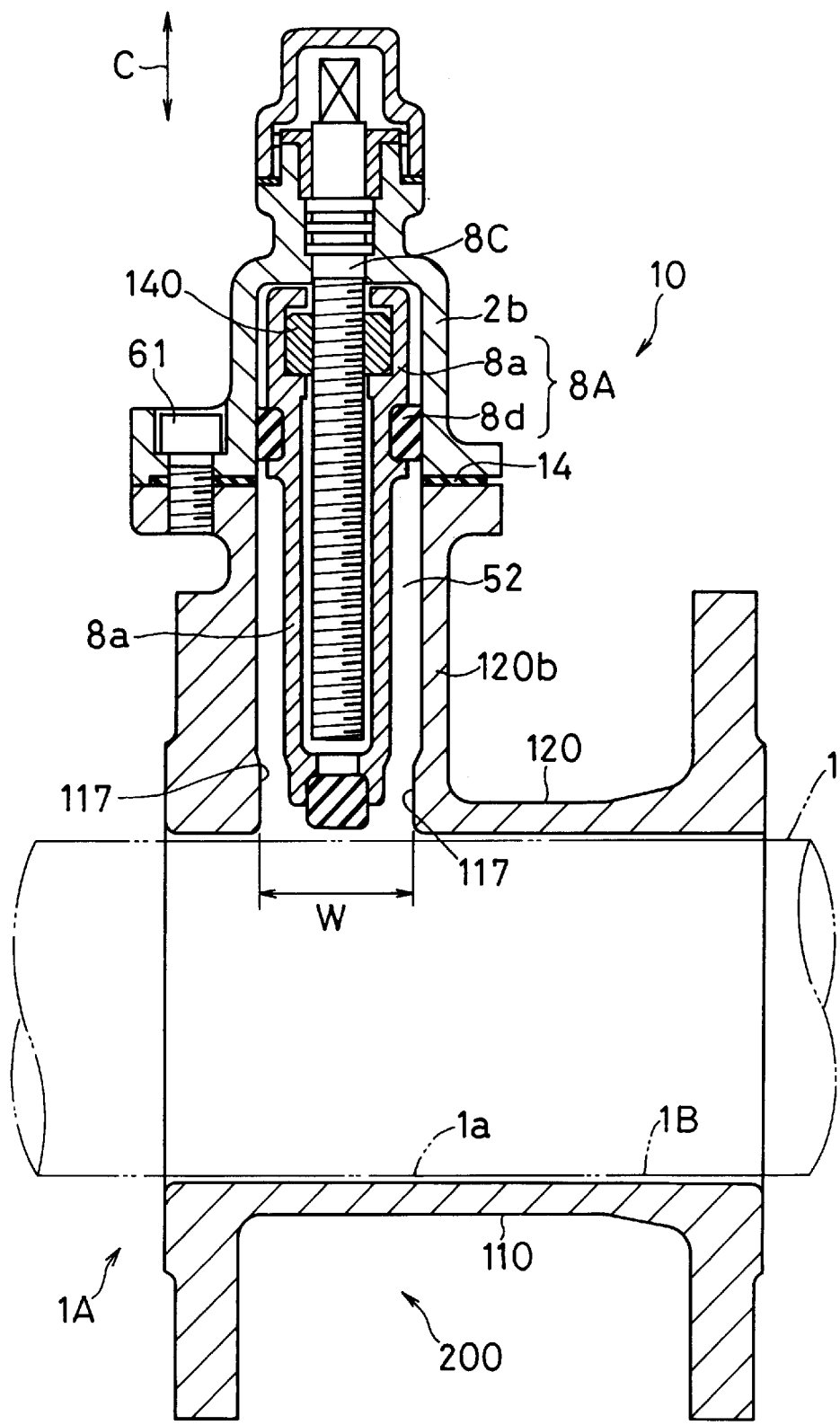
FIG. 9 is a longitudinal sectional view of what is shown in FIG. 8.

As shown in FIGS. 8 and 9, a valve assembly 10 has a valve casing 200, a gate 8A and a valve spindle 8C. The valve casing 200 forms after the completion of valve insertion work a flow passage 1B in which water flows, and is provided with first and second divisional cases 110, 120 separated from each other in the circumferential direction R of an already-installed pipe 1 and a valve bonnet 2b. A valve bonnet 2b is fixed to the second divisional case 120 by assembling bolts 61. The gate 8A is housed in advance in the valve casing 200. The valve spindle 8C is adapted to move slidingly the gate 8A in the direction C crossing the already-installed pipe 1 at substantially right angles thereto.

As shown in FIG. 8, a clearance between the valve bonnet 2b and second divisional case 120, and a clearance between the first and second divisional cases 110, 120 are sealed with rubber packings 14.

The second divisional case 120 is provided with a first and second branch portion 110b, 120b projecting outward in a forking state in the radial direction C of the already-installed pipe 1. The first branch portion 110b is formed diagonally with respect to the second branch portion 120b so as to branch therefrom.

Figure 14:
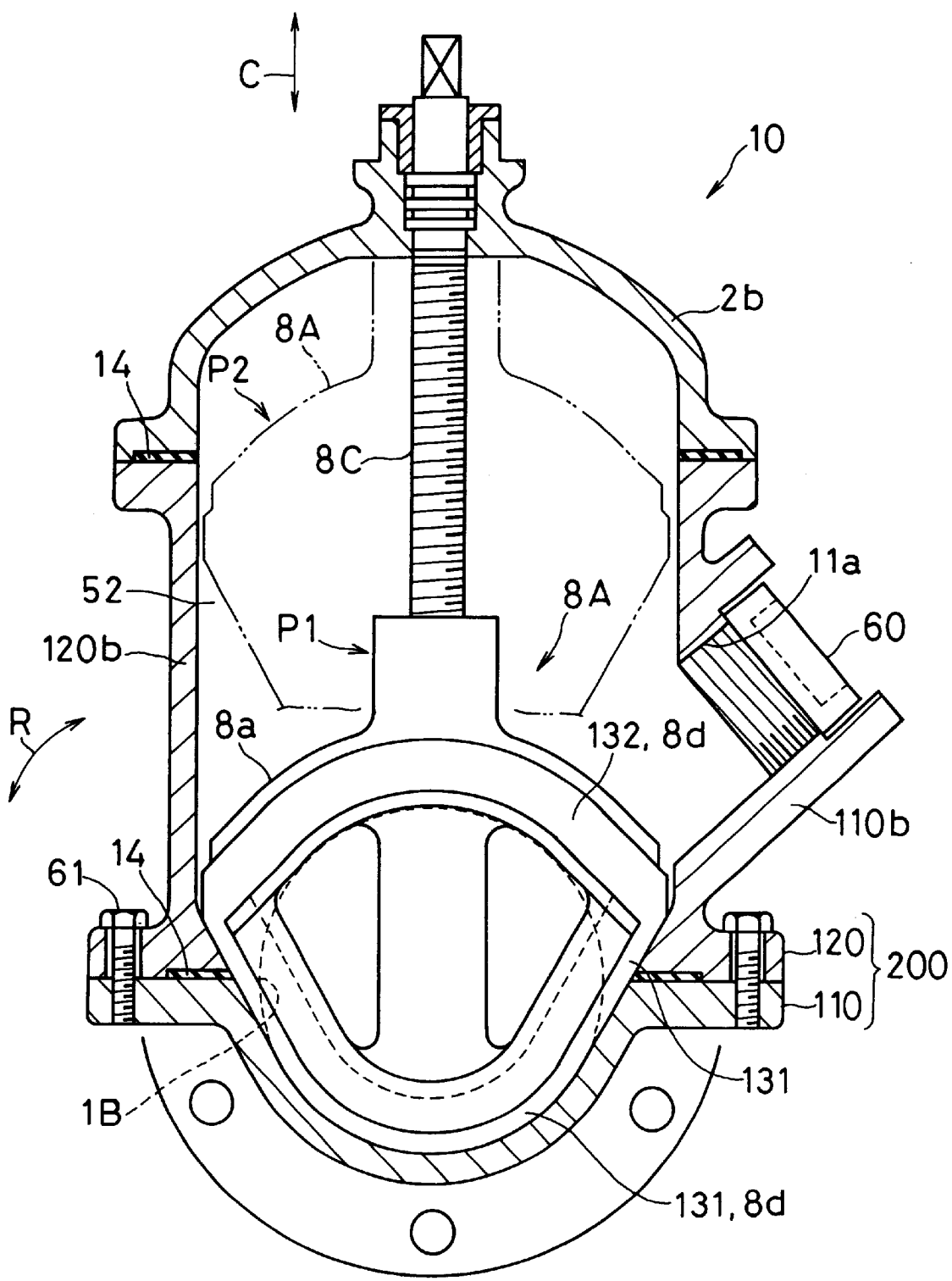
FIG. 14 is a horizontal sectional view showing the valve assembly in a gate-closed condition.
Figure 15A:
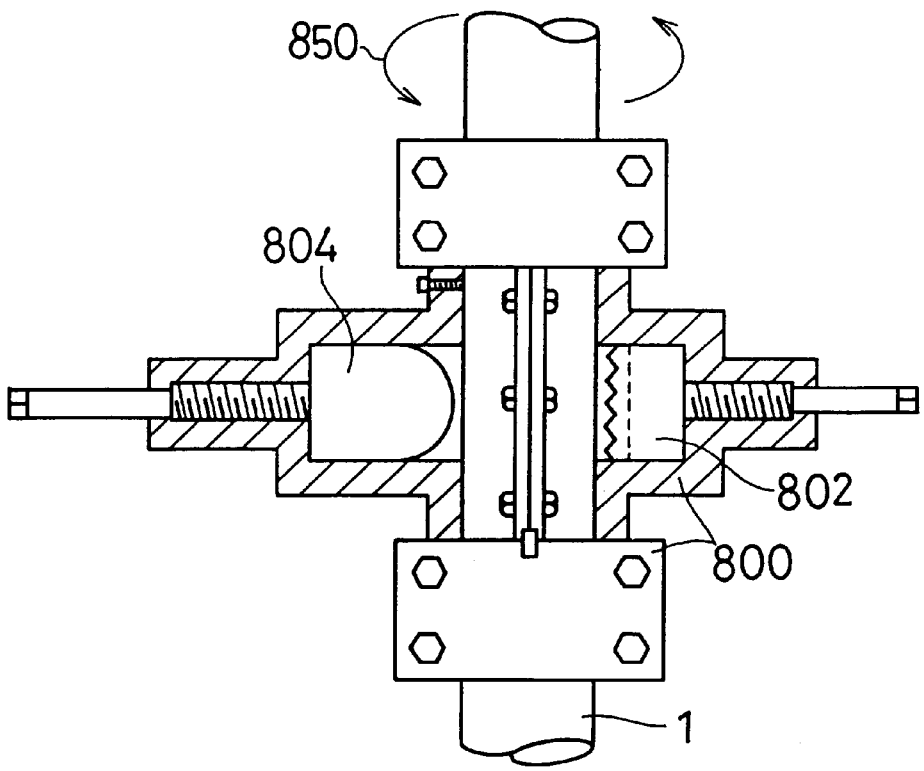
FIG. 15(a) is a sectional view showing the condition of a conventional valve insertion method in which the grooving operation is not yet carried out.
Figure 15:
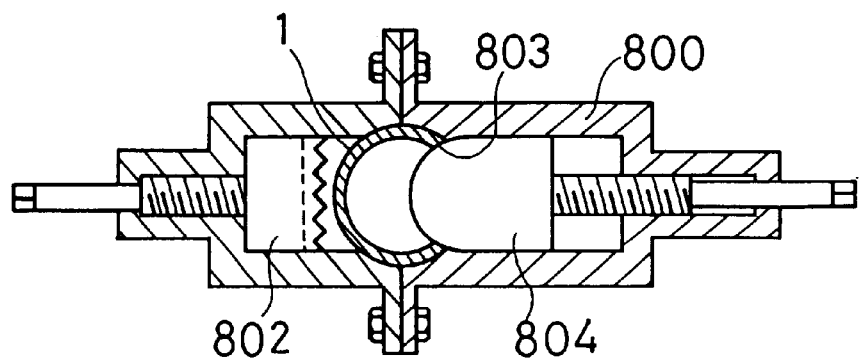
FIG. 15(b) is a sectional view showing the condition of the same method with the grooving operation already finished.
Figure 16:
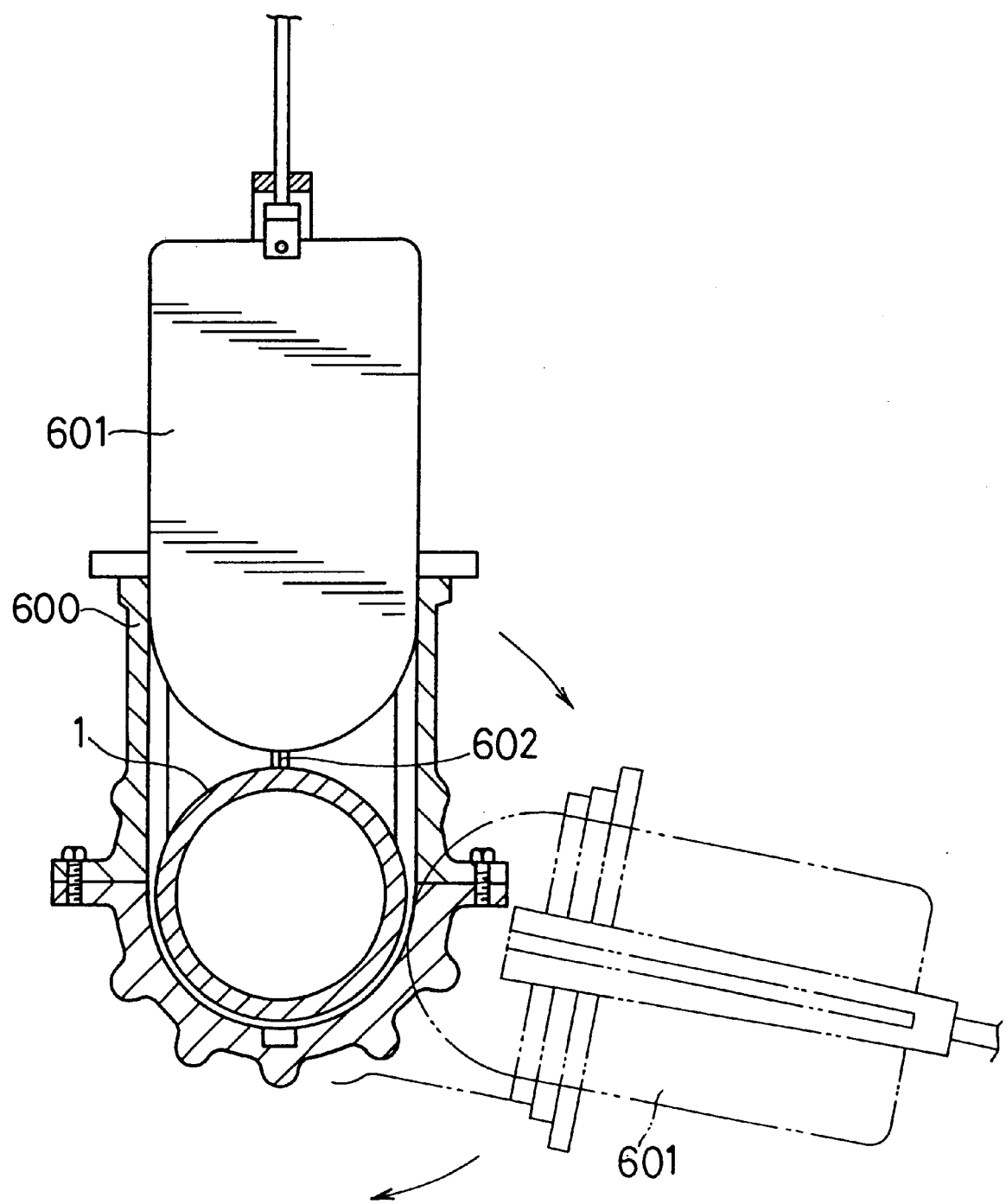
FIG. 16 is a sectional view showing another conventional valve insertion method.

The first branch portion 110b forms a tool entering hole 51 opened toward the center of the already-installed pipe 1, and a milling type cutting tool 4 passes through this first branch portion 110b. An attachment 34 of a cutting apparatus 3 is fixed to the first branch portion 110b via an operation gate valve (operation valve) 70. The operation gate valve 70 is fixed to the first branch portion 110b so that it can open and close the tool entering hole 51. A clearance between the first branch portion 110b and operation gate valve 70, and a clearance between the operation gate valve 70 and attachment 34 are sealed with rubber rings (not shown). The first branch portion 110b has therein a female screw portion 11a into which a plug 60 of FIG. 14 is screwed.

A valve bonnet 2b is fixed to the second branch portion 120b. The second branch portion 120b and valve bonnet 2b form a gate housing hole 52 housing the gate 8A in the gate-opened condition. The gate housing hole 52 is opened in a flow passage 1B to enable the gate 8A to slidingly move in the radial direction C of the already-installed pipe 1. A width W of the opening, which is on the side of a free end of the gate 8A, of the gate housing hole 52 is set larger than an outer diameter D of the cutting tool 4 shown in FIG. 8.

Gate 8A

Figure 10:
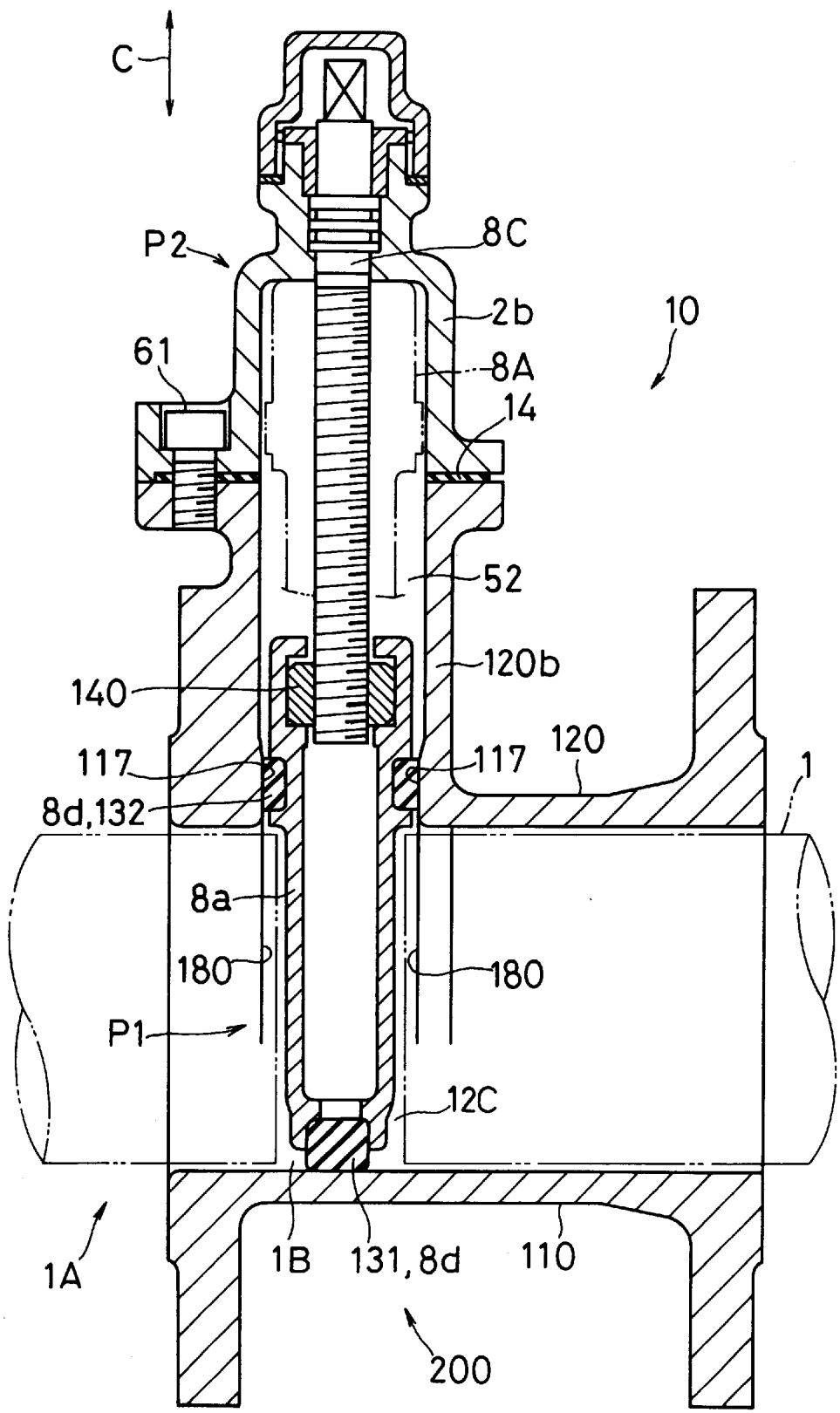
FIG. 10 is a longitudinal sectional view showing a valve assembly in a gate-closed condition.

The construction of the gate 8A inserted into the flow passage 1B will now be described. As shown in FIG. 10, when the valve spindle 8C is rotated to positive and negative direction, the gate 8A is slidingly moved in the gate housing hole 52 in the direction C which crosses the flow passage 1B at substantially right angles thereto. Namely, the gate 8A is made movable between a gate closing position P1 in which the flow passage 1B is closed and a gate opening position P2 in which the gate is housed in the gate housing hole 52. The valve spindle BC has a known piece 140 screwed thereon.

Figure 11A:
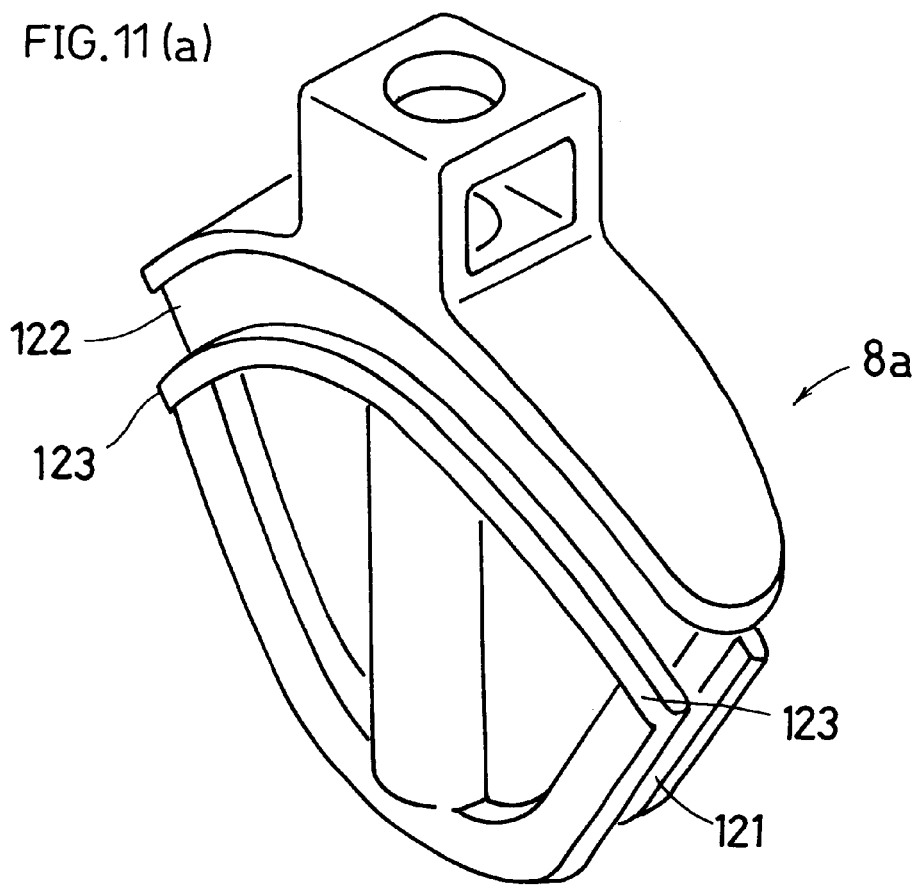
FIG. 11(a) is a perspective view showing a gate body.

As shown in FIGS. 11(a) and (b), the gate 8A has a gate body 8a, and a water leakage preventing rubber packing 8d set on the gate body 8a.

As shown in FIG. 11(a), the gate body 8a is provided with mutually ranging first and second fitting grooves 121, 122. As shown clearly in FIG. 12(d), the first fitting groove 121 is formed in a front view in the shape of the letter "V" or "U" so as to extend from a lower end surface of the gate body 8a to both ends thereof along a plane crossing the flow passage 1B, which is shown by a two-dot-chain line, at substantially right angles thereto. Especially, in this embodiment, a lower end portion 121a of the first fitting groove 121 (as shown in FIGS. 12(c) and 12(d)) is formed arc shaped along an inner circumferential surface of the flow passage 1B, and upper portions 121b thereof are tapered so as to extend toward the diagonally upward direction.

Figure 12A:
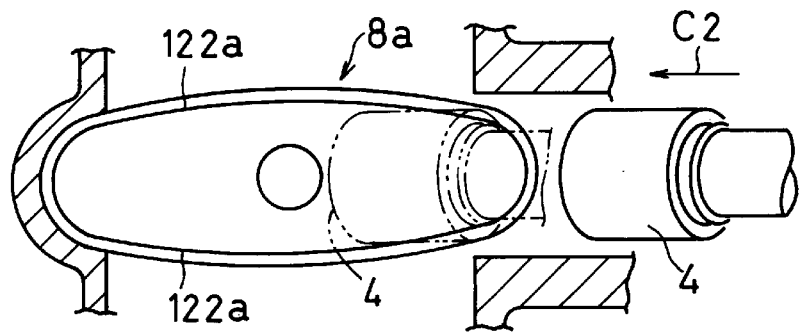
FIG. 12(a) is a schematic sectional view in plan showing the condition with the grooving operation already started.

The second fitting groove 122 is joined to the upper end portions of the first fitting groove 121 as shown in FIG. 11(a), and formed in the shape of a substantially elliptic ring (annularly) by connecting together the upper end portions of the two side surfaces 122a, which cross the flow passage 1B at substantially right angles thereto, of the gate body 8a shown in FIGS. 12(a) and (d). As shown in FIG. 12(d), the second fitting groove 122 is formed in front view in the shape of an arc (arch) of a radius of curvature smaller than that of the inner circumferential surface of the flow passage 1B.

Figure 11B:
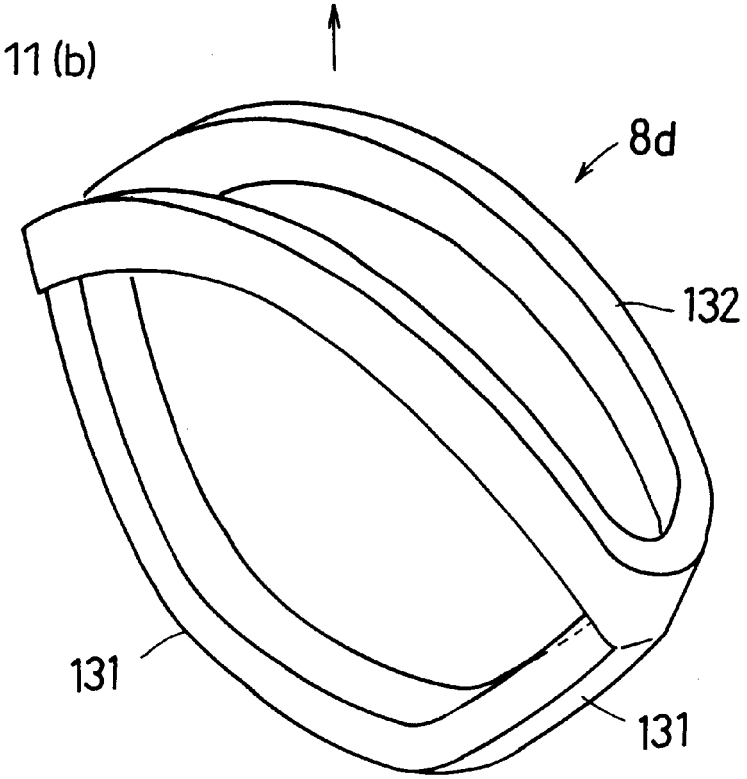
FIG. 11(b) is a perspective view showing a rubber packing.

As shown in FIG. 11(b), the rubber packing 8d comprises a substantially V-shaped or U-shaped first packing portion 131 and a substantially elliptic (annular) second packing portion 132 which are molded integral each other. The first and second packing portions 131, 132 have shapes in conformity with those of the first and second fitting grooves 121, 122 respectively of FIG. 11(a), and are fitted in these fitting grooves 121, 122 as shown by an arrow and in FIG. 13. The cross-sectional shape of the rubber packing 8d is substantially rectangular as shown in FIG. 9.

When the valve spindle 8C is turned to negative direction, the gate 8A is put in an gate-opened state as shown by a two-dot chain line in FIGS. 10 and 14. When the valve spindle 8C is turned to positive direction, the gate 8A slides from the cut groove 12C formed by the cutting tool 4 into the already-installed pipe 1. Owing to the axial force of the valve spindle 8C, the first packing portion 131 is pressed against the inner circumferential surface (inner wall surface) of the flow passage 1B in the valve casing 200, and the second packing portion 132 is pressed against side surfaces 117 in the second divisional case 120, so that the gate 8A is put in a gate-closed state as shown by solid lines. The side surfaces 117 are close to the flow passage 1B in the gate housing hole 52. The side surfaces 117 are tapered so that the gate housing hole 52 becomes narrower in the downward direction. The side surfaces 117 are formed along the second packing portion 132 of FIG. 13 so as to be opposed thereto.

Figure 12B:
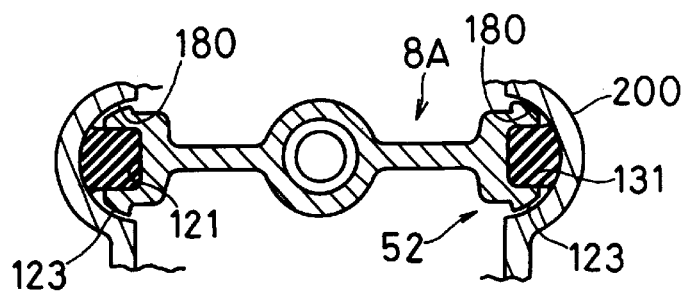
FIG. 12(b) is a horizontal sectional view of a gate taken along the line XIIb—XIIb.
Figure 12C:
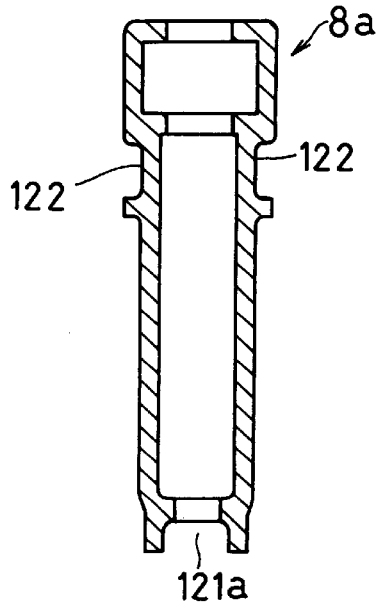
FIG. 12(c) is a sectional view of a gate taken along the line XIIc—XIIc shown in FIG. 12(d)
Figure 12D:
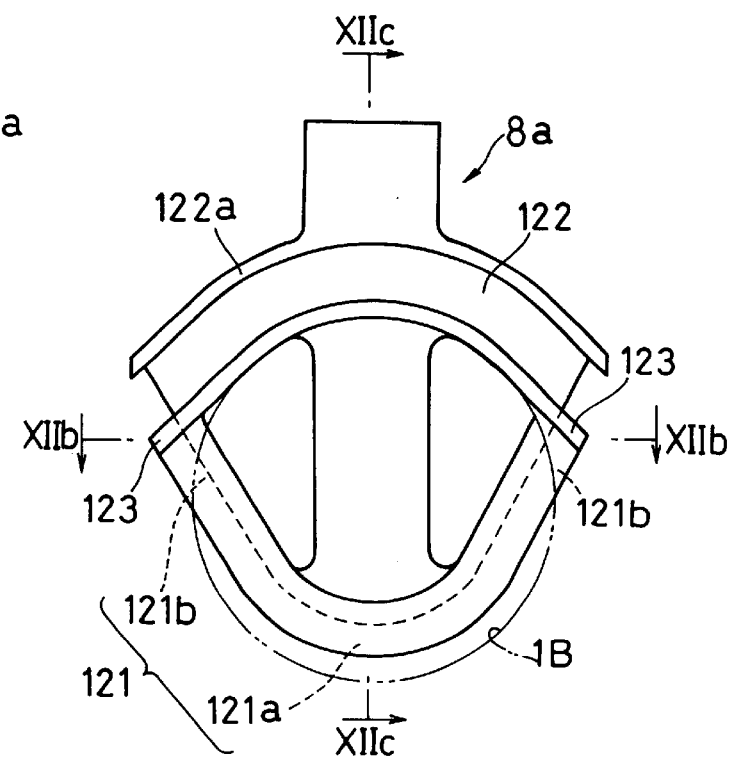
FIG. 12(d) is a front view showing the gate.
Figure 13:
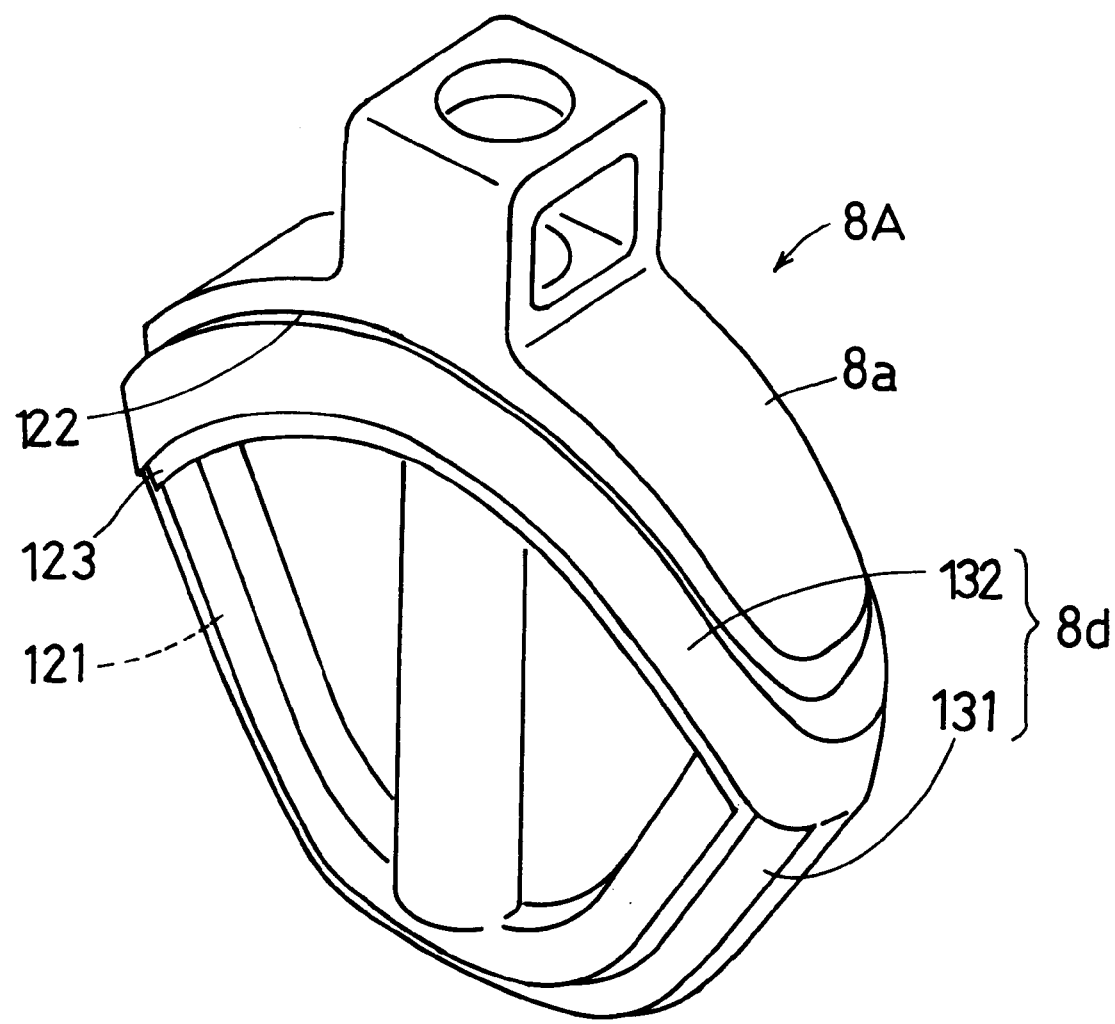
FIG. 13 is a perspective view showing the condition of the gate body on which the rubber packing is set.

In this embodiment, the gate body 8a of the gate-closed state is attached and locked as shown in FIG. 12(b) at side portions 123 of flow passage 1B with locking grooves 180 of the gate housing hole 52 in the valve casing 200.

The construction of the remaining portions of the valve assembly 10 is identical with that of the corresponding portions of the first embodiment, and the identical or equivalent portions are designated by the same reference numerals, the detailed descriptions and illustrations thereof being omitted.

Assembling Step

The procedure for a gate 8A insertion method will now be described.

First, the worker prepares the cutting apparatus 3, the valve assembly 10 and the operation gate valve 70. The worker then fixes the valve casing 200 to a portion to be cut of the already-installed pipe 1 in which a fluid (water) practically flows, and assembles two divisional cases 110, 120 together by assembling bolts 61. The worker then fixes the cutting apparatus 3 of FIG. 3 to the first branch portion 110b, and fixes the valve bonnet 2b, to which the gate 8A and the valve spindle 8C are fixed, to the second branch portion 120b by assembling bolts 61. Thus, as shown in FIGS. 8 and 9, the gate 8A and the cutting tool 4 are housed in the valve casing 200 with the gate 8A and the cutting tool 4 fixed thereto, whereby a part of the already-installed pipe 1 is enclosed air-tightly with the valve casing 200.

Drilling step

When the worker then drives the electric motor 35 of the cutting apparatus 3 of FIG. 3, the cutting tool 4 is rotated with a cutter shaft 32, and the rotation of the cutting tool 4 causes the cutting tool 4 to make cutting motions for cutting the already-installed pipe 1. When the worker feeds the cutting tool 4, which is in practical cutting motions in accordance with operating the cutting apparatus 3, in a cutting direction C2 by diagonally passing the same through a part of the gate housing hole 52 as shown by two-dot chain lines in FIG. 12(a), the cutting tool 4 advances by and by to a position in which a free end surface 40 passes through a part of a wall la of the already-installed pipe 1 as shown by a two-dot-chain line in FIG. 8. Cutting into the pipe 1 with the cutting tool 4 is thus completed.

Grooving Step

After the cutting tool 4 cuts into the already-installed pipe 1, the worker turns the valve casing 200 in the circumferential direction R of the already-installed pipe 1 of FIG. 8 with the cutting motions made by the cutting tool 4. Namely, the cutting tool 4 makes feeding motions, in which the cutting tool 4 with the valve casing 200 turns in the circumferential direction R of the already-installed pipe 1, as it rotates around the axis C1 of FIG. 3. Thus, the worker turns the cutting tool 4 around the whole circumference of the already-installed pipe 1 with the cutting tool 4 kept making the feeding motions. The already-installed pipe 1 is thus cut annularly as shown by two-dot-chain lines in FIG. 10 without producing a cut-off section, to form a cut groove 12C opened in the direction R of the range of the whole circumference thereof. The cut groove 12C forms a space in which the gate 8A slidingly moves.

Tool Takeout Step

The cutting apparatus 3 is then removed by a method which will now be described.

After the cut groove 12C is formed, the worker houses the cutting tool 4 of FIG. 8 in the cutter case 31A (FIG. 3), and then closes the operation gate valve 70 by operating a working lever 71 therefor. The worker then removes the cutting apparatus 3. After the cutting apparatus 3 is removed, the worker operates a known plug insertion means (not shown) to screw the plug 60 of FIG. 14 into a female screw portion 11a of the first branch portion 110b. After this screwing operation is finished, the worker removes the operation gate valve 70 and plug insertion means. The valve insertion operation is thus completed.

After the valve insertion work is completed, the gate 8A is lowered to a lower end through the cut groove 12C to stop the flow of the water.

As in the above paragraphs, the preferred embodiments have been described with reference to the drawings. A person skilled in the art will easily imagine various alterations and modifications within an obvious scope of the invention with reference to this specification.

For example, the prime mover for transmitting cutting motions to the cutting tool may comprise an engine besides a motor. The valve casing may be fixed to the cutting apparatus before the already-installed pipe is enclosed with therewith. The tool entering hole and cutting apparatus of FIG. 1 may be provided in and on either one of the first and second divisional cases.

When the cutting tool is made to cut into the already-installed pipe, it is generally preferable that the cutting tool be fed toward substantially the diametrical center of the pipe as in each embodiment. According to the present invention, it is unnecessary to feed the cutting tool toward the center of the pipe, and it may be fed in the radial direction thereof.

The valve casing may also be divided into three to four in the circumferential direction thereof. The gate may be inserted in any direction, i.e., from an upper or a side and a lower portion of the valve casing.

The present invention can be applied not only to a water pipe but also to a gas pipe. Namely, a fluid flowing in an already-installed pipe comprising even a fluid other than water, such as an oil is also included in the scope of the present invention. An emergency shutoff valve may also be inserted according to the present invention.

Therefore, such alterations and modifications are construed as matters within the scope of the present invention.

What is claimed is:

1. A cutting tool suitable for cutting an already-installed water pipe in non-water-flowing-stopping condition, comprising:

a substantially cylindrical cutter body having a base end surface, a free end surface and an outer circumferential surface, a plurality of first tips projecting forward from said free end surface of said cutter body, a plurality of second tips projecting outward from said outer circumferential surface of said cutter body, and a plurality of recesses formed in said cutter body, wherein (1) said recesses extend to a substantially central portion of said free end surface, and have a shape of a fan when said recesses are viewed from said free end surface, (2) said cutter body has a plurality of divisional surfaces defining each of said recesses, (3) each of said divisional surfaces extend in the radial direction of said cutter body, (4) not less than one first tip and not less than one second tip are fixed to one of said divisional surfaces, and (5) during a grooving operation in which (a) said cutter body is rotated about a longitudinal axis thereof and (b) said cutter body is fed in a circumferential direction of said already-installed water pipe so that said second tips form a cut groove in said already-installed water pipe, said recesses form discharge flow passages for discharging water and cutting chips produced due to said grooving operation to an exterior of said already-installed water pipe.

2. The cutting tool according to claim 1, wherein said recesses are generally formed so that cross-sections thereof become smaller from said free end surface toward said base end surface of said cutter body.

3. The cutting tool according to claim 1, wherein each of said tips is fixed to said divisional surface by a male screw.

4. A cutting tool suitable for cutting an already-installed water pipe in non-water-flow-stopping condition, comprising:

a substantially cylindrical cutter body having a base end surface, a free end surface and an outer circumferential surface, a first tip projecting forward from said free end surface of said cutter body, a plurality of second tips projecting outward from said outer circumferential surface of said cutter body, and a plurality of recesses formed in said cutter body, wherein (1) said recesses extend to a substantially central portion of said free end surface, and have a shape of a fan when said recesses are viewed from said free end surface, (2) said cutter body has a plurality of divisional surfaces defining each of said recesses, (3) each of said divisional surfaces extend in the radial direction of said cutter body, (4) said first tip is fixed to one of said divisional surfaces, (5) not less than one second tip is fixed to one of said divisional surfaces, and (6) during a grooving operation in which (a) said cutter body is rotated about a longitudinal axis thereof and (b) said cutter body is fed in a circumferential direction of said already-installed water pipe so that said second tips form a cut groove in said already-installed water pipe, said recesses form discharge flow passages for discharging water and cutting chips produced due to said grooving operation to an exterior of said already-installed water pipe.

5. The cutting tool according to claim 4, wherein said recesses are generally formed so that cross-sections thereof become smaller from said free end surface toward said base end surface of said cutter body.

6. The cutting tool according to claim 4, wherein each of said tips is fixed to said division surface by a male screw.

* * * * *

UNITED STATES PATENT AND TRADEMARK OFFICE
CERTIFICATE OF CORRECTION

PATENT NO.    : 6,357,471 B1
DATED         : March 19, 2002
INVENTOR(S)   : Toshiyuki Sato and Tamotsu Yamashita It is certified that error appears in the above-identified patent and that said Letters Patent is hereby corrected as shown below:

<u>Title page,</u>
Item [73], Assignee should read -- Sulken Co., Ltd., Shiga (JP) -- instead of "Suiken Technology Co., Ltd., Shiga (JP)".

Signed and Sealed this

Third Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,357,471 B1
DATED : March 19, 2002
INVENTOR(S) : Toshiyuki Sato and Tamotsu Yamashita It is certified that error appears in the above-identified patent and that said Letters Patent is hereby corrected as shown below:

<u>Title page,</u>
Item [73], Assignee should read -- Suiken Co., Ltd., Shiga (JP) -- instead of "Suiken Technology Co., Ltd., Shiga (JP)".

This certificate supersedes Certificate of Correction issued September 23, 2002.

Signed and Sealed this

Tenth Day of December, 2002

JAMES E. ROGAN
*Director of the United States Patent and Trademark Office*